Patented Dec. 6, 1938

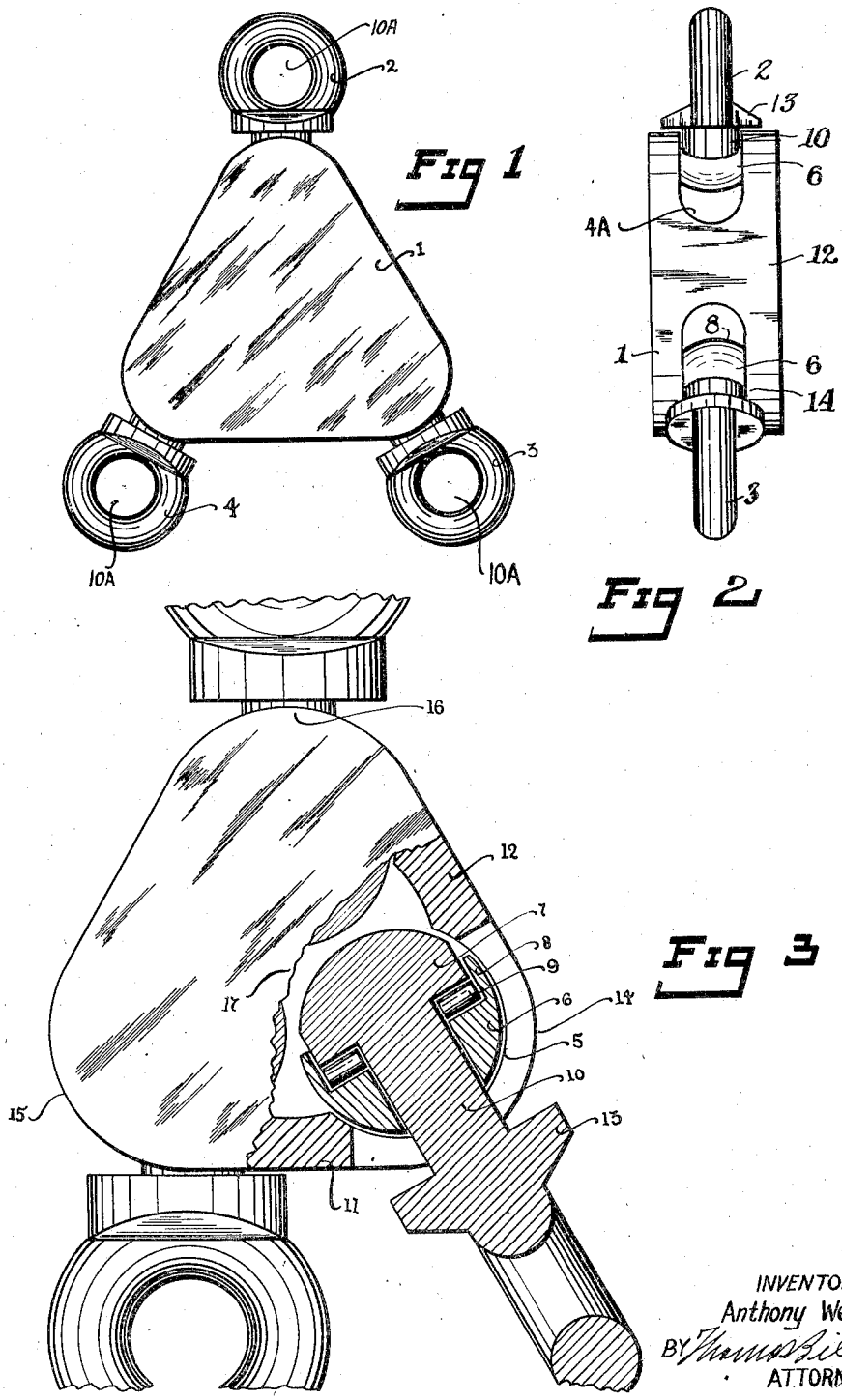

2,139,294

UNITED STATES PATENT OFFICE 2,139,294

THREE-WAY SWIVEL

Anthony Weigant, Portland, Oreg.

Application September 7, 1937, Serial No. 162,824

2 Claims. (Cl. 254—135)

My invention relates to blocks commonly used in the tackle of logging lines, ships' lines and in any and all places where relatively heavy loads are to be handled and swung and suspended from overhead lines or from crane booms and the like.

My invention is comprised primarily of a body element having a plurality of ball and socket swiveling heads swiveling about their longitudinal central axes and for moving the ball and socket joint within the body element.

The primary purpose and object of my invention is to provide a plurality of supports, all rotatably disposed within a common body element to provide a common support for a plurality of handling lines that are to be secured thereto.

A still further object of my invention consists in providing an overhead support that may be suspended from a line boom or other support and to which is attached a plurality of lines, each head may have an independent line attached and secured thereto. Each swiveling head has an eye formed in the outer end to facilitate the attaching of a fastening line thereto.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a plan view of a three-way swivel.

Fig. 2 is a side view of the device illustrated in Fig. 1.

Fig. 3 is a fragmentary, partially sectional, plan view of the three-way swivel.

Like reference characters refer to like parts throughout the several views.

I form my device of a body element 1. The body element 1 is recessed upon its inner side and is primarily comprised of spaced front and back walls secured together on their peripheral edges by being secured to a rim. Swiveling heads, here shown as three in number are illustrated at 2, 3, and 4. A socket 5 is provided for each of the swiveling heads and a section of a spherical ball 6 is provided for coacting with and being moved within the socket 5. A head 7 is disposed upon the inner end of the eye support and the head 7 may rest directly upon the ball 6 or I may provide anti-friction bearings between the head 7 and the ball 6. In order to provide a suitable raceway for the anti-friction bearings, here shown as roller bearings, I provide a rim 8 upon the outer head engaging end of the ball 6 so that the anti-friction bearings, as roller bearings, roll within the ball and upon the roller race of the ball and the underside of the head. A neck 10 of the eye support runs through the ball and connects the eye 10A with the head. A rim is disposed between the side walls, as illustrated at 11 and 12.

In the manufacture of the device the rim is preferably formed integral with one of the side walls and after the assembly is completed the other one of the side walls is then secured thereto by suitable fastening means as through the use of bolts or the same may be welded thereto. I recess the rim, as illustrated at 14 to permit a swinging action of the assembly within the socket. A collar 13 is disposed between the eye and the head. The side walls of the body element are preferably made triangular in form with each of the corners being rounded, as illustrated at 15 and 16. This provides a supporting tackle member having a plurality of line supports which may be secured thereto.

The swiveling heads may be of uniform size or where one of them is to be used as the primary support and the other supports may be made smaller as it is apparent that the total load would be supported by one of the swiveling heads and each of the others would individually support a lesser amount of load when all of the heads are supporting loaded lines.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, the combination of a body element that is comprised of spaced side walls that are secured together at their peripheral edges by a rim, socket joints disposed within the rim at spaced intervals, a section of a spherical ball fitted to each of the sockets, an anti-friction bearing race disposed at one side of the ball section, anti-friction bearings positioned within the bearing race, an eye fastening passing through the section of the ball, and headed over to complete the anti-friction bearing race for the anti-friction bearings and a spaced slit disposed in the rim of the assembly through which the neck of the eye member may be made to oscillate.

2. In a device of the class described, the combination of a body element that is comprised of a rim and spaced side walls that are secured to the rim, a plurality of socket bearings disposed in the body element and a ball bearing disposed in each of the socket bearings, an eye swiveling head coacting with each of the ball and socket assemblies associated with the body element and a slit in the rim of the body element through which the swiveling head is permitted to oscillate.

ANTHONY WEIGANT.